United States Patent
Moody et al.

(10) Patent No.: US 8,170,367 B2
(45) Date of Patent: May 1, 2012

(54) REPRESENTING FLAT DESIGNS TO BE PRINTED ON CURVES OF A 3-DIMENSIONAL PRODUCT

(75) Inventors: Jay T. Moody, Wayland, MA (US); Michael P. Daugherty, Somerville, MA (US); Terence M. Tirella, Winchester, MA (US)

(73) Assignee: Vistaprint Technologies Limited, Hamilton (BM)

( * ) Notice: Subject to any disclaimer, the term of this patent is extended or adjusted under 35 U.S.C. 154(b) by 1039 days.

(21) Appl. No.: 12/021,067

(22) Filed: Jan. 28, 2008

(65) Prior Publication Data

US 2009/0190858 A1    Jul. 30, 2009

(51) Int. Cl.
*G06K 9/36* (2006.01)
*G06F 17/50* (2006.01)

(52) U.S. Cl. .............................. 382/276; 382/285; 703/1

(58) Field of Classification Search .................. 382/285, 382/276, 294, 295, 305; 703/1; 709/203
See application file for complete search history.

(56) References Cited

U.S. PATENT DOCUMENTS

| | | | | |
|---|---|---|---|---|
| 5,798,923 A | * | 8/1998 | Laskowski | 702/5 |
| 6,862,374 B1 | * | 3/2005 | Nagai et al. | 382/285 |
| 7,120,311 B2 | * | 10/2006 | Snyder | 382/276 |
| 7,236,647 B2 | | 6/2007 | Lunetta et al. | |
| 2003/0065587 A1 | | 4/2003 | Parker et al. | |

FOREIGN PATENT DOCUMENTS

| | | |
|---|---|---|
| EP | 1124200 A | 8/2001 |
| WO | WO-03/081466 A | 2/2003 |
| WO | WO-2007/100767 A | 7/2007 |

* cited by examiner

*Primary Examiner* — Yon Couso
(74) *Attorney, Agent, or Firm* — Jessica J. Costa

(57) ABSTRACT

A design image is transformed into a projection design image comprising the design image as it will appear when projected onto a physical 3-dimensional (3-D) curved object. In an embodiment, pixels of the design image are mapped into corresponding mapped pixels in a projection design image according to how the design image will appear in a flattened image of the design projected or printed onto the object having 3-dimension curves. The projection design image may be combined with a product image of the object having 3-dimension curves to generate a customized product image of the object having 3-dimension curves incorporating the design image. The customized product image is displayed to a user when customizing a product with a design to ensure that the user understands how the physical product will appear when the design is printed or projected onto the physical product.

42 Claims, 6 Drawing Sheets

REPRESENTING FLAT DESIGNS TO BE PRINTED ON CURVES OF A 3-DIMENSIONAL PRODUCT

FIELD OF THE INVENTION

This invention relates to the displaying of product images on an electronic display and, more particularly, to the displaying a customized product image of a physical product customized with a flat 2-dimensional design substantially as it will appear when the design is projected or printed onto an object having curves in three dimensions.

BACKGROUND OF THE INVENTION

E-commerce websites where customers can view and order products for delivery have existed for years. More recently, websites have been introduced that allow a customer to customize a product with graphics to be printed on the product prior to delivery. For example, online printing services such as VistaPrint.com may offer products such as business cards, postcards, pens, t-shirts, and other products that may be printed with a user-customized design. Typically, these websites allow the user to first review uncustomized images of the various products that are available from the provider. When the user selects a specific product to customize, the sites typically provide online tools allowing the user to provide the text that the user desires to appear on the customized product. The user is also typically allowed to either upload a full color image from the user's computer to be incorporated into the product design and/or to select from a number of decorative designs, images, and other graphic elements that are provided for the user's use by the printing services provider. Images of the user text entries and the user-selected decorative elements, collectively referred to herein as "design images" are combined with the basic product image to create a composite image indicating the appearance of the printed product. When the design is completed to the user's satisfaction, the user can place an order through the site for production of a desired quantity of the corresponding printed product.

Images and graphics offered on a website or uploaded by a user are typically "flat" images—that is, a flat image displayed on a user's computer screen will appear substantially the same as it will appear when printed on a flat surface (for example, a business card or postcard). Thus, when a flat image is printed on a flat surface, it will not appear distorted. However, because a curved surface cannot be projected onto a flat plane without distortion, when a flat image is printed on a curved surface, the image itself will appear distorted. To avoid customer disappointment, it is desirable that the image of the product that is displayed to the customer on the customer's computer display be a substantially accurate representation of the physical product that the user will later receive. This is especially true when the image the customer intends to print is to be printed on a curved surface, such as a hat or ball.

To minimize the risk of customer surprise and disappointment when the printed product is delivered, it is highly desirable that the customer be shown an image of the product that is as accurate a depiction of the physical product as possible. There is, therefore, a need for systems and methods that modify a design image according to the shape of a product on which the design image is to be printed or displayed, and that combines and displays the modified image with an image of the actual product to give the customer a visual indication of how the design image will appear on the surface of the product on which the design image will actually be being printed or displayed.

SUMMARY

Embodiments of the invention are directed at satisfying the need for automated systems and methods for generating images for displaying on a user's computer display in a manner that substantially accurately represents the appearance of a flat design that will be printed or projected onto a curved portion of a 3-dimensional product.

In accordance with one embodiment of the invention, a method transforms a flat 2-dimensional (2-D) design image into a projection design image of the flat 2-D design image as it will appear when the flat 2-D design image is projected onto a physical 3-dimensional curved object. The method includes receiving the flat 2-D design image and mapping pixels of the flat 2-D design image into corresponding mapped pixels in a projection design image according to how the flat 2-D design image will appear in a flattened image of the 2-D design image projected or printed onto the object having 3-dimension curves.

In accordance with another embodiment of the invention, one or more computer readable media have embodied therein computer program code for transforming a flat 2-dimensional (2-D) design image into a projection design image of the flat 2-D design image as it will appear when the flat 2-D design image is projected onto a physical 3-dimensional curved object. The code includes code adapted to receive the flat 2-D design image; and code adapted to map pixels of the flat 2-D design image into corresponding mapped pixels in a projection design image according to how the flat 2-D design image will appear in a flattened image of the 2-D design image projected or printed onto the object having 3-dimension curves.

In accordance with another embodiment of the invention, a system for transforming a flat 2-dimensional (2-D) design image into a projection design image of the flat 2-D design image as it will appear when the flat 2-D design image is projected onto a physical 3-dimensional curved object includes means for receiving the flat 2-D design image; and a projection image generator which maps pixels of the flat 2-D design image into corresponding mapped pixels in a projection design image according to how the flat 2-D design image will appear in a flattened image of the 2-D design image projected or printed onto the object having 3-dimension curves.

In accordance with another embodiment of the invention, a computer-implemented product design method includes steps of displaying a workspace, providing user input tools for allowing a user to create or input a flat 2-dimensional design in the workspace, and displaying a customized product image comprising an image of a physical product being customized with the design and a projected image of the design as the design will appear when the flat 2-dimensional design is projected or printed onto a 3-dimensional curved portion of the physical product.

In accordance with another embodiment of the invention, one or more computer readable media have embodied therein computer program code for a product design method. The code includes code adapted to display a workspace, code adapted to provide user input tools for allowing a user to create or input a flat 2-dimensional design in the workspace, and code adapted to display a customized product image comprising an image of a physical product being customized with the design and a projected image of the design as the design will appear when the flat 2-dimensional design is projected or printed onto a 3-dimensional curved portion of the physical product.

In accordance with another embodiment of the invention, a system for designing customized 3-dimensional curved object includes a display, and a processor executing program code which displays a workspace on the display, provides user input tools for allowing a user to create or input a flat 2-dimensional design in the workspace, and which displays a customized product image comprising an image of a physical product being customized with the design and a projected image of the design as the design will appear when the flat 2-dimensional design is projected or printed onto a 3-dimensional curved portion of the physical product.

It is an advantage of the invention that a user is presented with a product image that indicates the actual effect of printing or projecting a flat design image onto a curved portion of a 3-dimensional product.

These and other objects, features and advantages of the invention will be better understood with reference to the accompanying drawings, description and claims.

DETAILED DESCRIPTION

It will be understood that while the discussion herein describes an embodiment of the invention in the field of preparation of customized printed hat, it will be understood that the invention is not so limited and is relevant to any application for displaying an image intended to depict the actual appearance of an object having 3-dimension curves after a flat design is printed or projected onto the physical object.

Figure 1A:
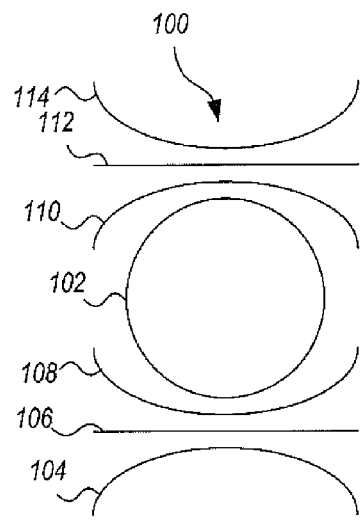
FIG. 1A shows an example 2-D design image.

In order to facilitate a full understanding of the present invention, the following discussion will first briefly introduce the concept of projecting 2-dimensional (2-D) images onto 3-dimensional (3-D) curved surfaces. Turning first to FIG. 1A, there is shown an example 2-D design image 100 that includes a circle 102, a set of lines 104, 106, 108 below the circle, and a set of lines 110, 112, 114 above the circle. The lines below the circle 102 include a convex curved line 104, a straight horizontal line 106, and a concave curved line 108.

The lines above the circle 102 include a convex curved line 110, a straight horizontal line 112, and a concave curved line 114.

Figure 1B:
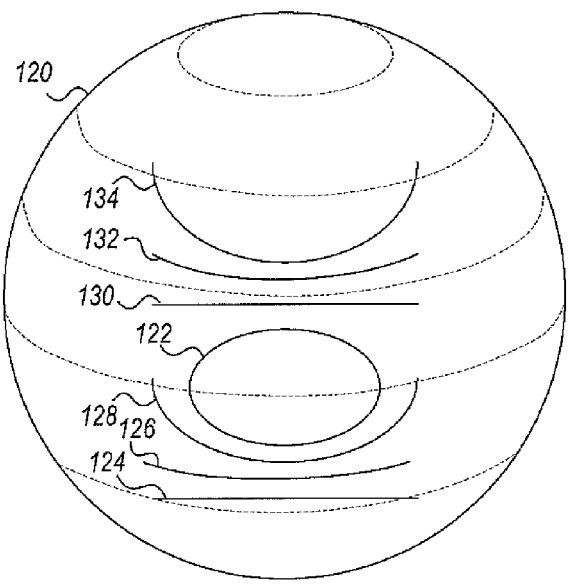
FIG. 1B shows an example 3-D product in the form of a sphere with the 2-D design image projected thereon.

Turning now to FIG. 1B, there is shown an image of an object having 3-dimension curves in the form of a sphere 120 with the 2-D design image of FIG. 1A projected thereon. It is well-known from map projection theory that when a straight line appearing in a 2-D flat image is projected onto a sphere, the straight line appears curved, while lines that appear curved in the 2-D flat image appear straighter when projected onto a sphere. Thus, as shown in FIG. 1B, the 2-D circle 102 of FIG. 1A projects onto the sphere 120 as an oval 122, convex line 104 projects onto the sphere 120 as a straight line 124, straight line 106 projects onto the sphere 120 as a slightly concave line 126, concave line 108 projects onto the sphere 120 as a slightly less concave line 128, convex line 110 projects onto the sphere 120 as a straight line 130, straight line 112 projects onto the sphere 120 as a slightly convex line 132, and concave line 114 projects onto the sphere 120 as a straight line 134. Projection of the flat image 100 onto the curved object therefore causes the projected image to appear distorted as compared to the flat image 100.

Figure 1C:
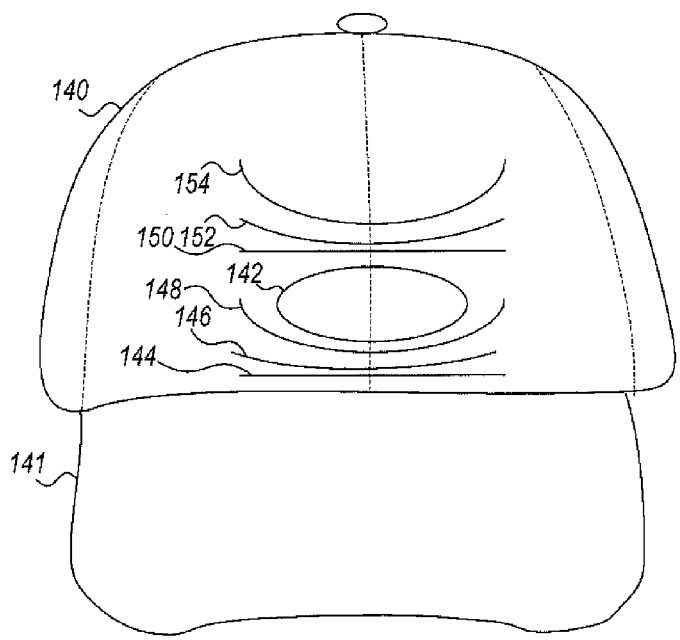
FIG. 1C shows an example 3-D product in the form of a hat with the 2-D design image projected on the curved portion above the brim.

FIG. 1C shows an image of an alternative object having 3-dimension curves in the form of a hat 140 with the 2-D design image of FIG. 1A projected thereon. In this embodiment, the image 100 is projected onto the curved portion of the hat above the hat brim 141, which is similar to projecting the image 100 onto the upper half of a sphere. As illustrated in FIG. 1C, the circle 102 of FIG. 1A projects onto the upper portion of the hat 140 as an oval 142, convex line 104 projects onto the upper portion of the hat 140 as a straight line 144, straight line 106 projects onto the upper portion of the hat 140 as a slightly convex line 166, concave line 108 projects onto the upper portion of the hat 140 as a straight line 148, convex line 110 projects onto the upper portion of the hat 140 as a straight line 150, straight line 112 projects onto the upper portion of the hat 140 as a slightly concave line 152, and concave line 114 projects onto the upper portion of the hat 140 as a slightly less concave line 154. Projection of the flat image 100 onto the upper portion of the hat 140 therefore also causes the projected image to appear distorted.

Figure 2:
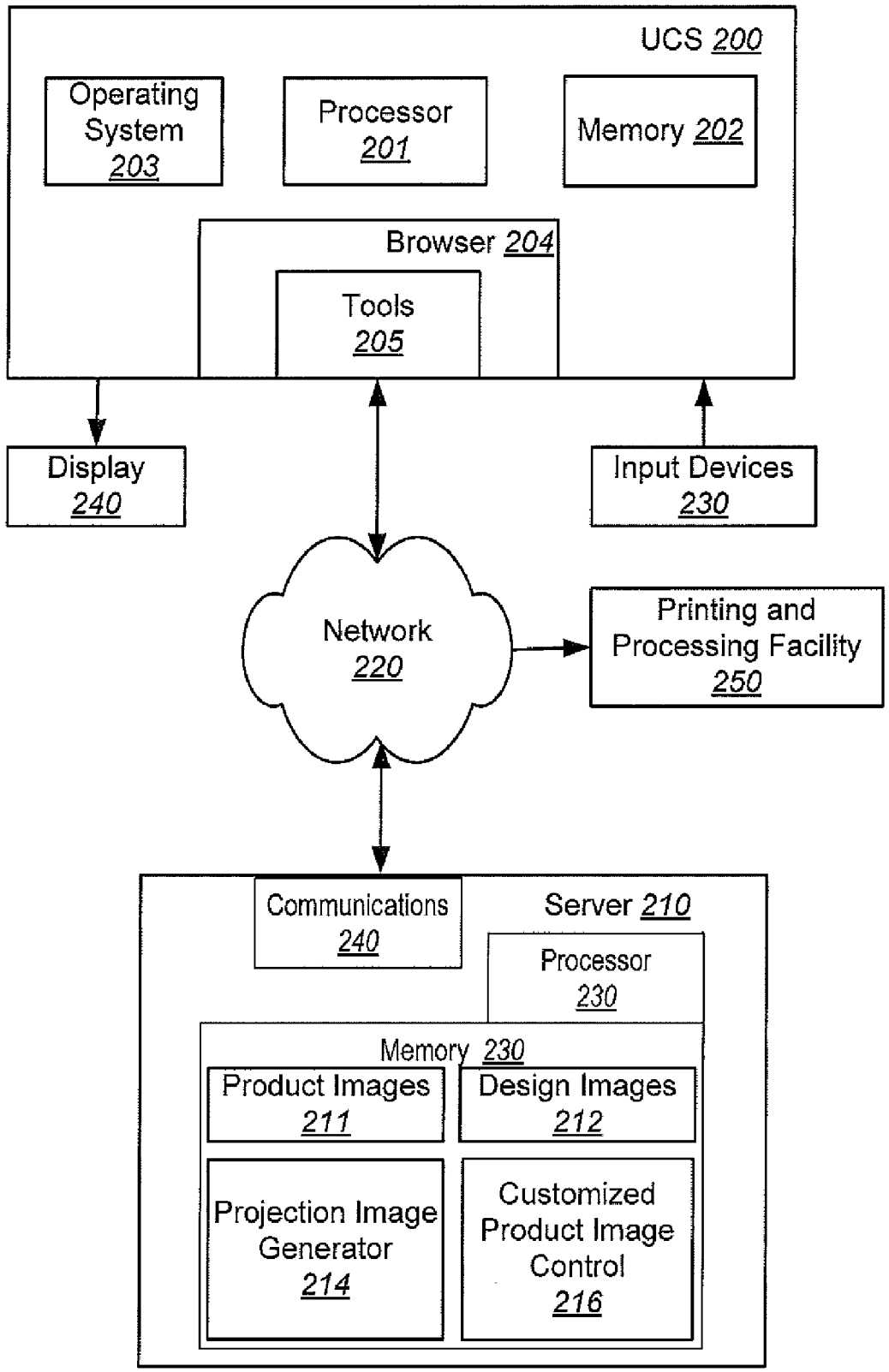
FIG. 2 is a block diagram of an exemplary system with which the invention may be employed.

FIG. 2 is a block diagram of a website system 200 which offers object having 3-dimension curves which may be customized by allowing a user-selected or user-uploaded 2-D flat image to be printed or displayed thereon. FIG. 2 depicts one illustrative system with which the invention may be employed. User computer system UCS 200 includes processor 201 and memory 202. Memory 202 represents all UCS 200 components and subsystems that provide both instruction and data storage for UCS 200, such as RAM, ROM, and internal and external hard drives. In addition to providing permanent storage for all programs installed on UCS 200, memory 202 also provides temporary storage required by the operating system and any application program that may be executing. In the embodiment described herein, UCS 200 is a typically equipped personal computer, but UCS 200 could also be any other suitable device for interacting with server 210, such as a portable computer, a tablet computer, or a computer system particularly adapted or provided for electronic product design, such as a product design kiosk, workstation or terminal. The user views images from UCS 200 on display 240, such as a CRT or LCD screen, and provides inputs to UCS 200 via input devices 110, such as a keyboard and a mouse.

When UCS 200 is operating, an instance of the USC 200 operating system, for example a version of the Microsoft Windows operating system, will be running, represented in FIG. 2 by operating system 203. In FIG. 2, UCS 200 is running a Web browser 204, such as, for example, Internet Explorer from Microsoft Corporation. In the depicted embodiment, Tools 205 represents product design and ordering programs and tools downloaded to UCS 200 via Network 220 from remote Server 210, such as downloadable product design and ordering tools provided by VistaPrint Limited and publicly available at VistaPrint.com. Tools 205 runs in browser 104 and exchanges information and instructions with Server 210 during a design session to support the user's preparation of a customized product. When the customer is satisfied with the design of the product, the design can be uploaded to Server 210 for storage and subsequent production of the desired quantity of the physical product on appropriate printing and post-print processing systems at printing and processing facility 250. Facility 250 could be owned and operated by the operator of Server 110 or could be owned and operated by another party.

While Server 210 is shown in FIG. 2 as a single block, it will be understood that Server 210 could be multiple servers configured to communicate and operate cooperatively to support Web site operations. Server 210 will typically be interacting with many user computer systems, such as UCS 200, simultaneously. Server 210 includes components and subsystems including processor 220 executing program instructions, memory 230 storing program instructions and data, such as RAM, ROM, and disk drives or arrays having stored thereon the various computer programs, product layouts, designs, colors, fonts, and other information to enable the creation and rendering of electronic product designs, and communication hardware 240 which enables communication with the UCS 200.

In the embodiment discussed herein, server 210 includes a number of stored images of various products, such as photographic images of various hats and other items available for customization and purchase, collectively depicted in FIG. 2 as product images 211. Server 210 also retains a plurality of design images 212, which are images and graphic elements that are available for the user to select and add to the user's hat design for customization purposes. Tools 205 allow the use to enter one or more strings of text for incorporation into the design. The user's text information is transferred by tools 205 from UCS 200 to server 210 and server 210 creates a corresponding image of the appropriate size for displaying to the user. These user text images and the decorative images and graphics are collectively indicated in FIG. 2 as design images 212. While shown in FIG. 2 as two blocks, it will be understood that product images 211 and design images 212 could be stored in a single memory device or distributed across multiple memory devices.

In interacting with server 210 to create a custom product design, the user is typically presented with one or more screen displays (not shown) allowing the user to select a type of product for customization and then review thumbnail images of various design images prepared by the site operator and made available for incorporation into the product design by the user. To provide the customer with a wide range of design choices, each design image may comprise a combination of graphics, images, color schemes, and/or other design elements. The service provider has also pre-selected one or more default fonts to be used to render any text entered by the user. When a product and a design image have been selected by the user for customization, an initial product design page is downloaded from server 220 to UCS 200.

Figure 3:
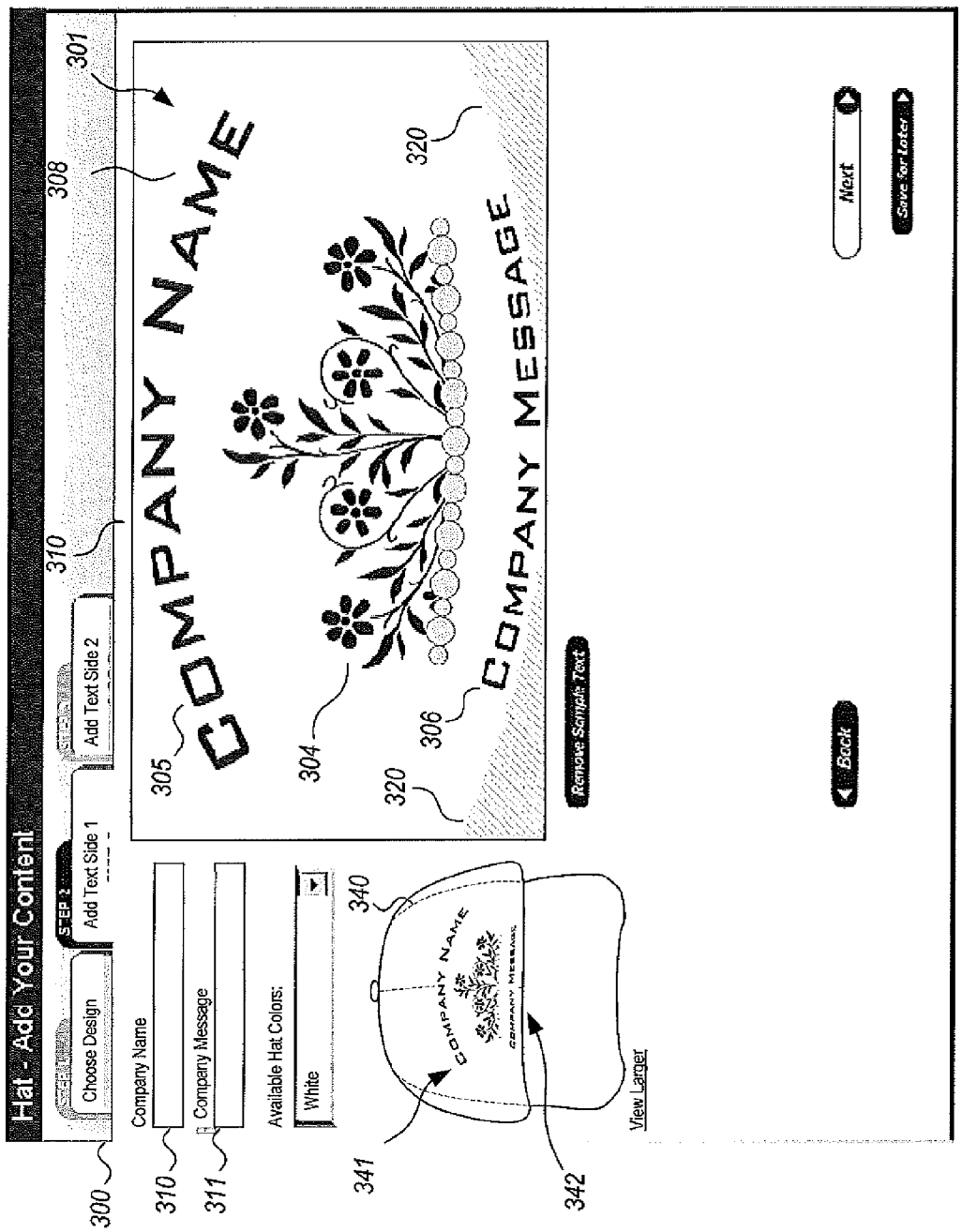
FIG. 3 shows an illustrative product design page for display on a user's display screen.

FIG. 3 depicts an illustrative embodiment of product design page 300. The product design page 300 includes a design work space 310 where a design image 301 may be designed. In this example, the design image 301 is the combination of a graphical image 304 depicting a floral image and two pre-defined text images 305, 306 displayed on transparent background 308. In the depicted example, the service provider has initially provided default text images 305, 306 with the placeholder text "Company Name" and "Company Message" to give the user an indication of the relative size and location of where and how the user's text entries will appear.

The product design page 300 also includes a product image 340. Product image 340 depicts the selected product in combination with the design image 301 and indicates the appearance of the finished printed product. In FIG. 3, product image 301 is an image of a hat, corresponding to the product being customized with an image.

Text entry fields 310 and 311 are provided to allow the user to enter whatever characters the user desires to appear on the hat in the areas 305, 306. The characters entered by the user could include letters, numbers, punctuation marks or other symbols as supported by the site operator. All characters of all types entered by the user are collectively referred to herein as "text". Images corresponding to the user's text are created at server 210, returned to UCS 200 and rendered by tools 205 at the appropriate locations 305, 306 relative to graphical image 304.

In this illustrative example, graphical image 304 comprises a plurality of flowers emerging out of a slightly concave curved row of circles. Because the design image 301 will be printed flat onto the curved upper portion of the hat to avoid customer disappointment in the final product, it is important that the product image 301 appear substantially as the actual final product will look. Because the actual product (in this case, a hat) is curved, and the flat design image 301 will be printed or projected onto the curved surface of the hat, the design image will appear distorted in the actual product. Accordingly, the design image appearing on the product image 301 is a morphed version 341 of the design image 301, as shown, which is morphed according to the curves of the actual product.

More specifically, the product image 301 is a canonical view of a hat (that which is most commonly expected of a hat on display for sale or viewing) in which the bill seam line (where the bill attaches to the hat) creates a horizontal line reference point. It is common that text or images printed (or embroidered) on a hat follow that brim seam line such that in the canonical view, the text or image appears to be also perfectly horizontal. Because the 3-D hat is flattened at print time (to use a printer with a print head that moves only in a single plane), and then is un-flattened for wearing, it is important to actually print curved image 304 and curved text 305, 306 so that it appears straight (horizontal) in the canonical view. The presentation method embodied and described herein has the advantage of allowing the user to create a design that appears straight in the canonical view even though to achieve that they must arrange the image so that there is a curve. Thus, the workspace 310 may include a brim indicator 320, such as a line or shaded regions indicating the brim line on the actual hat. This assists the designer in understanding that in order for any image or text to follow the brim line 342 in the actual product, the image or text must be curved in the design 301 itself (Note that the brim line 342 appears as a straight line in the product image 341 due to the orientation of the hat, and if the physical hat were to be rotated in the direction of the brim, the brim line 342 would begin appearing concave).

Figure 4:
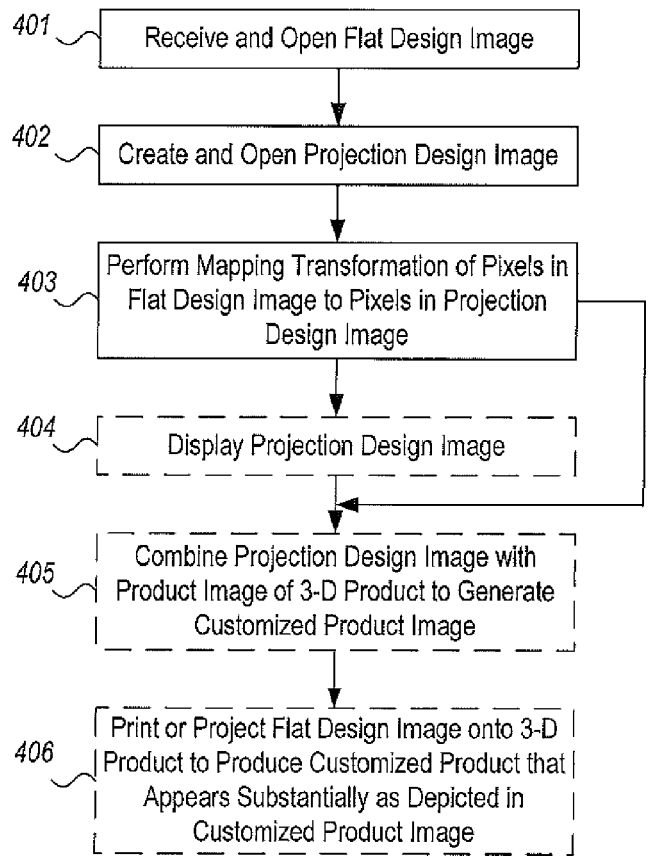
FIG. 4 illustrates an exemplary embodiment of a method for transforming a flat design image into a projection image of the flat design image as it will appear when projected onto an object having 3-dimension curves.
Figure 5:
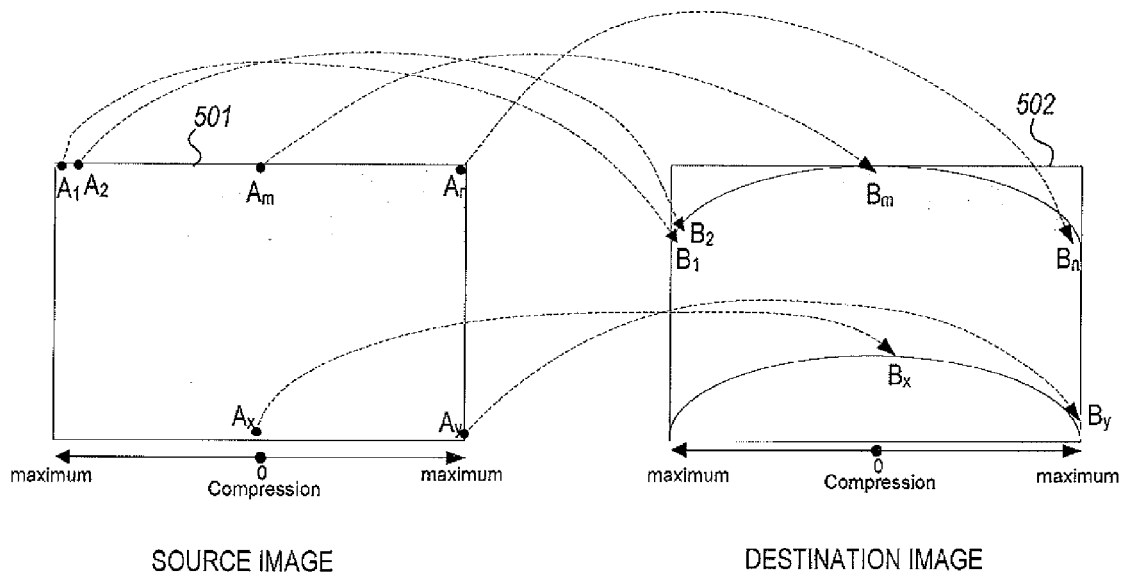
FIG. 5 illustrates a mapping transformation for a face of a hat.

FIG. 4 illustrates an exemplary embodiment of a method for transforming a flat design image into a projection image of the flat design image as it will appear when projected onto an object having 3-dimension curves. In the method 400, a flat design image is received and opened (step 401). A projection design image is created and opened (step 402). Pixels in the source image are transformed according to the mapping transformation into corresponding mapped pixels in the destination image, thereby generating a projection design image (step 403). This is illustrated in FIG. 5, wherein the mapping transformation maps data points A (or, as used hereinafter, "pixels") in a source image (e.g., the flat 2-D design image) to pixels B in a destination image (e.g., the projection design image) according to how the flat 2-D design image will appear in a flattened image of the 2-D design image projected or printed onto the object having 3-dimension curves. (Note, only a few pixels A are shown being transformed, but in practice all pixels of the source image 501 will typically be transformed to corresponding pixels in the destination image 502.) Because the surface of the hat on which the flat design image will be printed is curved in three dimensions, the pixels of the source image (flat design image) are transformed in two dimensions. For example, with regard to the x-dimension, the pixels nearest to the vertical edges of the source image map to pixels even closer together along the x-dimension in the destination image, whereas pixels near the center of the source image map to pixels further away from each other in the destination image. Furthermore, with regard to the y-dimension, the pixels map according to the curve of the 3-dimensional object. Thus, each pixel in the source image may be transformed in both the x- and y-dimension to produce the destination image.

In an embodiment, the mapping transformation is determined by actually projecting or printing a flat design image 301 onto a physical hat, obtaining an image of projected or printed image on the hat, and for each pixel in the flat design image 301, determining a corresponding pixel in the projected or printed image that the pixel maps to. This mapping transformation may be applied to any image having the same dimensions and resolution of the flat design image.

The projection design image may then be displayed (step 404), for example on a user's display. Alternatively, or in addition, the projection design image may be combined with a 2-D image of the object having 3-dimension curves to generate a customized product image of the object having 3-dimension curves incorporating the design image (step 405) for display to the user (step 406), such as, for example, as exemplified by the product image 301 in FIG. 3. Finally, the flat design image may be printed or projected onto an actual product to generate a customized project that appears substantially as depicted in the customized product design image (step 407).

Figure 6:
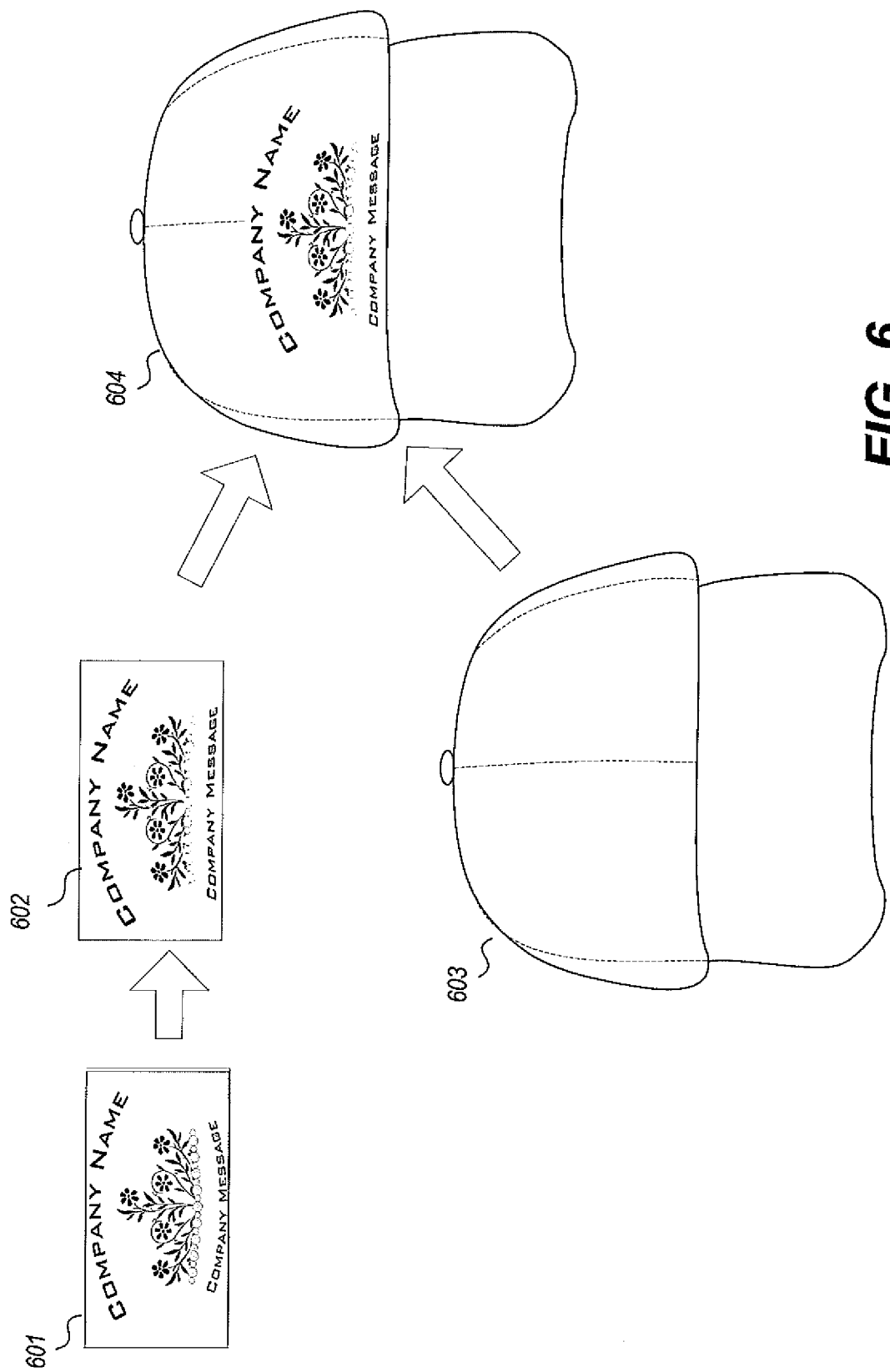
FIG. 6 is a diagram illustrating the transformation of a design image into a into a customized product image.

FIG. 6 diagrammatically illustrates the transformation of a design image 601 into a morphed image 602 and its combination with a product image 603 into a customized product image 604.

Figure 7:
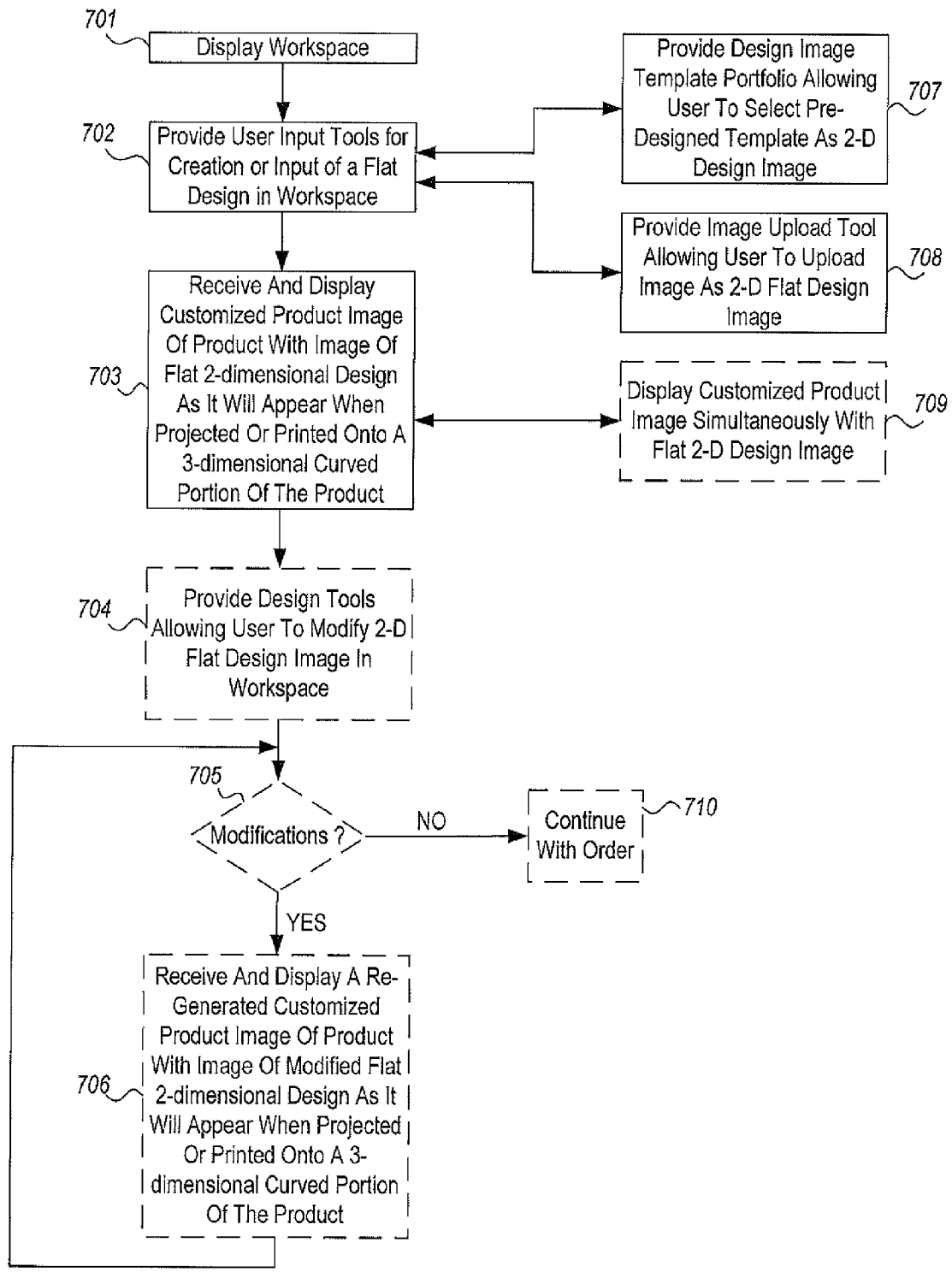
FIG. 7 is a flowchart of an exemplary method for customizing an object having 3-dimension curves with a flat 2-D design image.

FIG. 7 is a flowchart of an exemplary method for customizing an object having 3-dimension curves with a flat 2-D design image. The method may be executed, for example, at a client computer which is in operative communication with a server computer which performs the actual generation of the customized product image, for example as illustrated in FIG. 2. In this method, a display screen is presented to the user customizing the product, for example as shown in FIG. 3. On this display screen 300, a workspace 310 is displayed (step 701), along with user input tools for creating, inputting, and preferably editing, a flat 2-dimensional design in the workspace (step 702). The tools may include a design image template tool which allows the user to select a pre-designed template as the design 301 from a portfolio of a plurality of pre-designed design templates (step 707). Alternatively, or in addition, the tools may include an image upload tool which allows the user to upload an image from the user's computer or personal library of images and other graphics (step 708). Upon input or creation of the design in the workspace 310, an image of the product being customized with the design is generated (for example, at a server), and the customized product image is received and displayed (step 703), preferably simultaneously with the design 301 in the workspace 310 (step 709). The customized product image is an image of the 3-D curved product being customized (for example, a hat), as the design 301 in the workspace 310 will appear when projected or printed onto the actual product. If no modifications are made to the design, the design is complete, and an order process may be started or continued (step 710).

Design tools may also be provided to allow the user to modify the design 301 in the workspace 310 (step 704). When edits or other modifications (such as removal of the current design and selection of an alternate design image from the portfolio of design images or the uploading of an alternate image) are made to the design in the workspace (as detected in step 705), the customized product image is updated with the modified design (for example, at a server), and the updated customized product image is received and displayed (step 706), preferably simultaneously with the design 301 in the workspace 310.

It will be appreciated that the idea of morphing a flat design image into a projected image for incorporation into a product image may be applied to any product image wherein the area of the actual product to be printed on is curved in three dimensions. For example, while the embodiments show herein are applied to hats, the product may likewise be applied to other products that are curved in 3 dimensions such as, but not limited to, balls, protective sporting equipment pads, snowglobes, etc.

While an exemplary embodiment of the invention has been discussed, the described embodiment is to be considered as illustrative rather than restrictive. The scope of the invention is as indicated in the following claims and all equivalent methods and systems.

What is claimed is:

1. A method for transforming a design image into a projection design image indicating how the design image will appear when the design image is printed or projected on a 3-dimensional (3-D) curved object and the object is viewed from a known position, comprising:
   receiving a flat 2-dimensional (2-D) design image of known dimensions and resolution;
   applying, by one or more processors, a mapping transformation to the flat 2-D design image to generate a projection design image, the mapping transformation determined by
   (a) obtaining an image of the 3-D curved object having a flat 2-D image projected or implemented thereon, the flat 2-D image having the same known dimensions and resolution as the known dimensions and resolution of the received flat 2-D design image, and
   (b) mapping, by one or more processors, each respective pixel in the flat 2-D image to a corresponding pixel in the 3-D object image where the content of the respective pixel appears in the 3-D object image.

2. The method of claim 1, further comprising:
   displaying, by one or more processors, the projection design image.

3. The method of claim 1, further comprising:
   sending, by one or more processors, the projection design image to a user computer for display on a display screen.

4. The method of claim 1, further comprising:
combining, by one or more processors, the projection design image with a product image of the object having 3-dimension curves to generate a customized product image of the object having 3-dimension curves incorporating the flat 2-D design image.

5. The method of claim 4, further comprising:
displaying, by one or more processors, the customized product image.

6. The method of claim 5, wherein:
the customized product image is displayed simultaneously with the design image.

7. The method of claim 4, further comprising:
sending, by one or more processors, the customized product image to a user computer for display on a display screen.

8. The method of claim 7, wherein:
the customized product image is displayed simultaneously with the design image on the display screen of the user computer.

9. The method of claim 4, further comprising:
printing the design image onto a physical instance of the 3-D curved object to generate a customized product that appears substantially as depicted in the customized product design image.

10. The method of claim 4, further comprising:
projecting the design image onto a physical instance of the 3-D curved object to generate a customized product that appears substantially as depicted in the customized product design image when the design image is projected onto the object having 3-dimension curves.

11. Non-transitory computer readable storage tangibly embodying program instructions which, when executed by a computer, implement a method for transforming a flat 2-dimensional (2-D) design image into a projection design image of the design image as it will appear when the design image is projected onto a physical 3-dimensional curved object, the method comprising:
receiving a flat 2-dimensional (2-D) design image of known dimensions and resolution;
applying a mapping transformation to the flat 2-D design image to generate a projection design image, the mapping transformation determined by
(a) obtaining an image of the 3-D curved object having a flat 2-D image projected or implemented thereon, the flat 2-D image having the same known dimensions and resolution as the known dimensions and resolution of the received flat 2-D design image, and
(b) mapping each respective pixel in the flat 2-D image to a corresponding pixel in the 3-D object image where the content of the respective pixel appears in the 3-D object.

12. The non-transitory computer readable storage of claim 11, the method further comprising:
displaying the projection design image.

13. The non-transitory computer readable storage of claim 11, the method further comprising:
to sending the projection design image to a user computer for display on a display screen.

14. The non-transitory computer readable storage of claim 11, the method further comprising:
compositing the projection design image with a product image of the object having 3-dimension curves to generate a customized product image of the object having 3-dimension curves incorporating the design image.

15. The non-transitory computer readable storage of claim 14, the method further comprising:
displaying the customized product image.

16. The non-transitory computer readable storage of claim 15, the method further comprising:
displaying the customized product image simultaneously with the design image.

17. The non-transitory computer readable storage of claim 14, the method further comprising:
sending the customized product image to a user computer for display on a display screen.

18. The non-transitory computer readable storage of claim 17, the method further comprising:
displaying the customized product image simultaneously with the design image on the display screen of the user computer.

19. The non-transitory computer readable storage of claim 14, the method further comprising:
causing the design image to be printed onto the physical object having 3-dimension curves to generate a customized product that appears substantially as depicted in the customized product design image.

20. The non-transitory computer readable storage of claim 14, the method further comprising:
causing the design image to be projected onto the physical object having 3-dimension curves to generate a customized product that appears substantially as depicted in the customized product design image when the design image is projected onto the object having 3-dimension curves.

21. A system for transforming a flat 2-dimensional (2-D) design image into a projection design image of the design image as it will appear when the design image is projected onto a physical 3-dimensional curved object, comprising:
one or more processors configured to receive the design image; and
a projection image generator which applies a mapping transformation to the design image to generate a projection design image, the mapping transformation determined by
(a) obtaining an image of the 3-D curved object having a flat 2-D image projected or implemented thereon, the flat 2-D image having the same known dimensions and resolution as the known dimensions and resolution of the received design image, and
(b) mapping each respective pixel in the flat 2-D image to a corresponding pixel in the 3-D object image where the content of the respective pixel appears in the 3-D object image.

22. The system of claim 21, wherein:
the one or more processors comprising a server in operative communication with a client, wherein the design image is downloaded from the client.

23. The system of claim 21, further comprising:
at least one processor;
data storage which stores the design image and the projection design image;
instruction memory which stores processor-readable instructions, which, when executed by the at least on processor, implement the projection image generator.

24. The system of claim 21, further comprising:
a customized product image generator which combines the projection design image with a product image of the object having 3-dimension curves to generate a customized product image of the object having 3-dimension curves incorporating the design image.

25. The system of claim 24, further comprising:
at least one processor;

data storage which stores the design image, the projection design image, the product image, and the customized product image;
instruction memory which stores processor-readable instructions, which, when executed by the at least on processor, implement the projection image generator and the customized product image generator.

26. The system of claim 24, further comprising:
a display for displaying the design image and the customized product image.

27. The system of claim 26, wherein:
the display comprises a display screen on a client computer, the client computer in operative communication with a server computer to receive from the server computer at least the customized product image and to display the design image simultaneously with the customized product image.

28. The system of claim 24, further comprising:
a printing system for printing the design image onto the physical object having 3-dimension curves to generate a customized product that appears substantially as depicted in the customized product design image.

29. The system of claim 24, further comprising:
a projector which projects the design image onto the physical object having 3-dimension curves to generate a customized product that appears substantially as depicted in the customized product design image when the design image is projected onto the object having 3-dimension curves.

30. A computer-implemented product design method, comprising:
displaying a workspace;
providing, by one or more processors, user input tools for allowing a user to create or input a flat 2-dimensional design in the workspace;
applying, by one or more processors, a mapping transformation to the flat 2-D design image to generate a projection design image, the mapping transformation determined by
(a) obtaining an image of the 3-D curved object having a flat 2-D image projected or implemented thereon, the flat 2-D image having the same known dimensions and resolution as the known dimensions and resolution of the received flat 2-D design image, and
(b) mapping, by one or more processors, each respective pixel in the flat 2-D image to a corresponding pixel in the 3-D object image where the content of the respective pixel appears in the 3-D object image; and
compositing, by one or more processors, the projection design image with an image of the 3-D curved object without the flat 2-D image projected or implemented thereon to generate a composite image; and
displaying the composite image to the user.

31. The method of claim 30, wherein the workspace having the design therein and the customized product image are displayed simultaneously.

32. The method of claim 30, wherein the user input tools comprise a design template tool which allows a user to view and select a design image template from a portfolio of design image templates offered by a design provider for entry into the workspace.

33. The method of claim 30, wherein the user input tools comprise an image upload tool that allows a user to upload a design image into the workspace.

34. The method of claim 30, further comprising:
allowing, by one or more processors, a user to modify the design in the workspace;
re-generating, by one or more processors, the customized product image based on the modified design, including a modified projected image of the modified design as it will appear when projected or printed onto the 3-dimensional curved portion of the physical product; and
displaying the re-generated customized product image.

35. Non-transitory computer readable storage tangibly embodying program instructions which, when executed by a computer, implement a method for designing a product, the cede method comprising:
displaying a workspace;
providing user input tools for allowing a user to create or input a flat 2-dimensional design in the workspace;
applying a mapping transformation to the flat 2-D design image to generate a projection design image, the mapping transformation determined by
(a) obtaining an image of the 3-D curved object having a flat 2-D image projected or implemented thereon, the flat 2-D image having the same known dimensions and resolution as the known dimensions and resolution of the received flat 2-D design image, and
(b) mapping each respective pixel in the flat 2-D image to a corresponding pixel in the 3-D object image where the content of the respective pixel appears in the 3-D object image; and
compositing the projection design image with an image of the 3-D curved object without the flat 2-D image projected or implemented thereon to generate a composite image and
displaying the composite image to the user.

36. The non-transitory computer readable storage of claim 35, the method further comprising:
simultaneously displaying the workspace having the design therein and the customized product image.

37. The media non-transitory computer readable storage of claim 35, the method further comprising:
providing a design template tool which allows a user to view and select a design image template from a portfolio of design image templates offered by a design provider for entry into the workspace.

38. The non-transitory computer readable storage of claim 35, the method further comprising:
providing an image upload tool that allows a user to upload a design image into the workspace.

39. The non-transitory computer readable storage of claim 35, the method further comprising:
allowing a user to modify the design in the workspace;
re-generating the customized product image based on the modified design, including a modified projected image of the modified design as it will appear when projected or printed onto the 3-dimensional curved portion of the physical product; and
display the re-generated customized product image.

40. A system for designing customized 3-dimensional curved object, comprising:
a display displaying a workspace;
one or more processors configured to
provide user input tools for allowing a user to create or input a flat 2-dimensional design in the workspace, and
apply a mapping transformation to the flat 2-D design image to generate a projection design image, the mapping transformation determined by (a) obtaining an image of the 3-D curved object having a flat 2-D image projected or implemented thereon, the flat 2-D image having the same known dimensions and resolution as the known dimensions and resolution of the received flat 2-D design image, and (b) mapping each respective pixel in the flat 2-D image to a corresponding pixel in the 3-D object image where the content of the respective pixel appears in the 3-D object image; and composite the projection design image with an image of the 3-D curved object without the flat 2-D image projected or implemented thereon to generate a composite image and display the composite image to the user.

41. The system of claim 40, wherein the customized product image and the workspace having the design therein are displayed simultaneously.

42. The system of claim 40, wherein the user input tools comprise an image upload tool that allows a user to upload a design image into the workspace.

* * * * *